Feb. 25, 1969     DAVID TEH-LIANG CHANG     3,429,494
ELECTRICAL MOTOR-TACHOMETER MOUNTING
Filed May 22, 1967
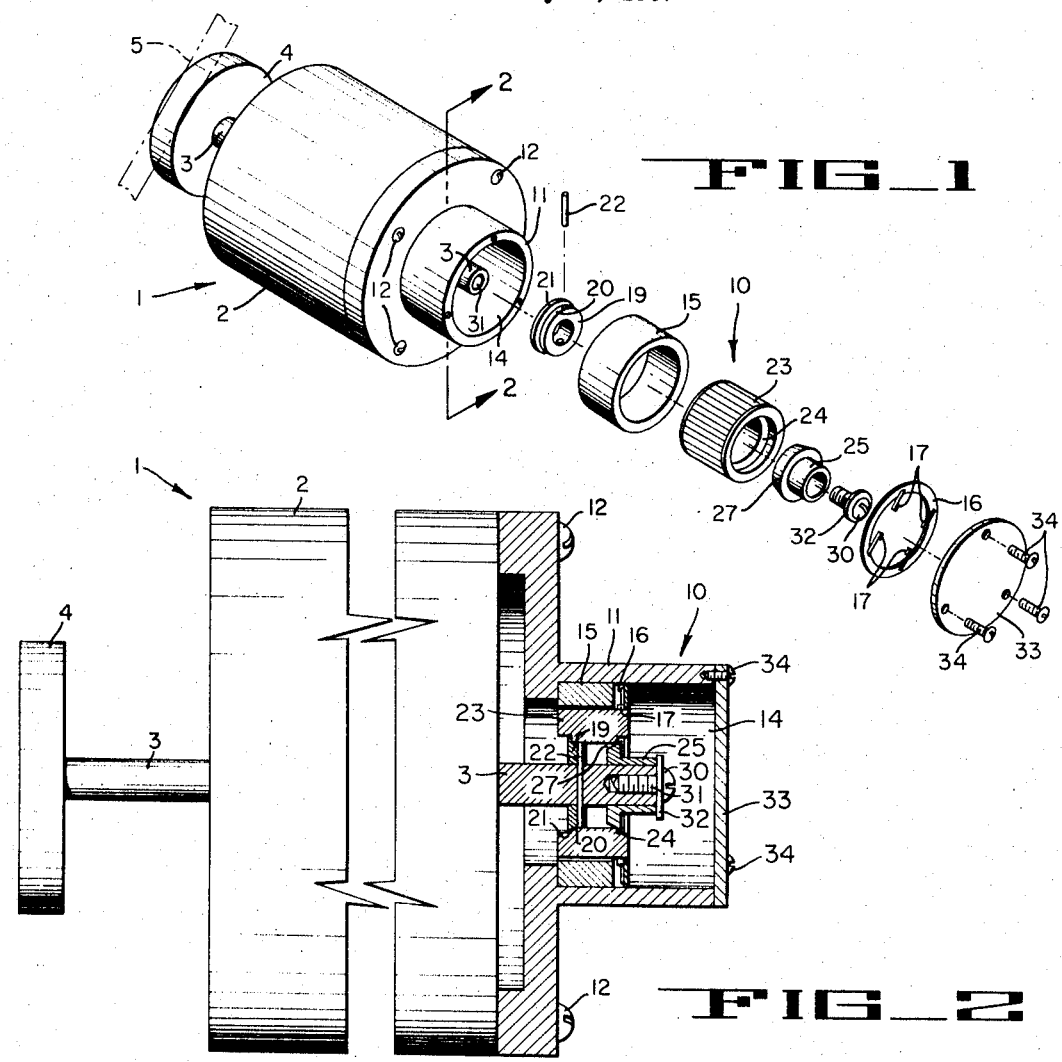
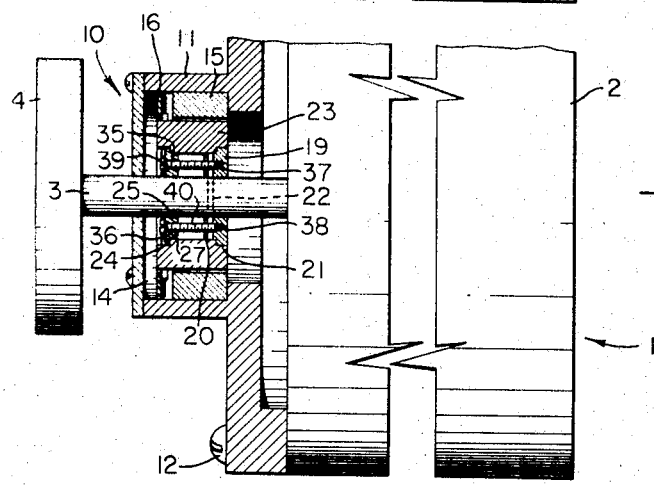
INVENTOR.
DAVID T.L. CHANG
BY *Thomas Schatzel*
ATTORNEY United States Patent Office 3,429,494
Patented Feb. 25, 1969

3,429,494
ELECTRICAL MOTOR-TACHOMETER
MOUNTING
David Teh-Liang Chang, Altadena, Calif., assignor to Ampex Corporation, Redwood City, Calif., a corporation of California
Filed May 22, 1967, Ser. No. 640,320
U.S. Cl. 226—188                8 Claims
Int. Cl. F16c 3/00

ABSTRACT OF THE DISCLOSURE

An electrical motor-tachometer mounting assembly of which the tachometer is directly coupled to the shaft of a driving electrical motor, the rotational velocity of which is to be measured. The assembly includes a tachometer housing seured to the motor housing, a tachometer stator positioned within the tachometer housing and substantially concentric with the motor shaft, a first hub securely fastened to the shaft, a tachometer rotor assembly engaging the first hub in substantial concentric alignment, a second hub concentric with the shaft and urging the rotor towards the first hub, the second hub having a tapered outer peripheral surface engaging the rotor and concentrically aligning the rotor with the shaft, and fastening means securing the second hub to the shaft.

---

Though those skilled in the art will readily recognize that the present motor-tachometer arrangement has numerous applications, the arrangement has been found to have highly beneficial use in connection with the servo control system of magnetic tape transport machine. Magnetic tape transports commonly employ capstan means for driving a magnetic tape past a magnetic record and/or playback head. Suitable torque means are associated with the capstan whereby for various operating conditions, such as recording, playback, and rewind, the tape is maintained under substantially constant tension. Also, during record and playback, the tape speed is precisely controlled and dependent on the rotational velocity of the driving motor coupled to the capstan. Accordingly, a servo is employed in which the motor rotational velocity is measured by a tachometer generating a voltage proportional and responsive to the motor rotational velocity and consequently the capstan rotational velocity. The degree of accuracy of the feedback signal is an important factor for all tape speeds and becomes even critical where high information density is employed on the magnetic tape and high tape speeds, i.e., 120–150 inches per second are desired. Consequently, the mechanical coupling between the motor shaft and the tachometer must be precisely aligned and close tolerances maintained since any deviations from concentricity in the armature plane are reflected in the feedback signal. It is common that the tachometer rotor not exceed 0.0006 inch of true concentricity with the tachometer stator element. It is further desired, especially for aircraft use, that the transport be compact and durable. Furthermore, it is necessary that it tolerate variations in temperature and compensate for heat expansion without sacrificing accuracy as it is not uncommon for the tachometer to encounter temperatures exceeding 120° centigrade during operation.

A common prior art structure for assemblying a tachometer to a motor is to mount the tachometer on the end of the motor shaft by means of a hub clamp. The tachometer shaft is within a separate housing in which bearings are employed and the armature is mounted directly onto the shaft by a press fit. The disadvantages encountered in such an arrangement where high precision is required, such as in high speed, high-density magnetic tape transports, is that a press fit requires very close tolerance. Consequently, there are high costs in precision machining the various components. Furthermore, it is very difficult to remove the rotor from the shaft and frequently, when it is removed the shaft is damaged and no longer usable. Also, it is common to encounter difficulty assembling the arrangement and parts are frequently damaged, especially during the pressing operation. Another way of mounting the armature to the tachometer shaft is through the use of cement. However, cements soften at high temperatures making them unsuitable for high temperature applications such as frequently encountered in the tape transports.

The present invention provides a tachometer-motor assembly overcoming the above limitations in which the tachometer is directly mounted on the motor shaft. A mounting hub is securely fastened to the motor shaft with one longitudinal end of the rotor assembly positioned in engagement with the hub. A second hub member having a tapered outer peripheral edge is also positioned about the motor shaft. The second hub is designed to engage the rotor about its other longitudinal edge and simultaneously urge the rotor assembly against the first hub and align the rotor concentrically with the motor shaft. The pressure or frictional engagement of the two hubs and the rotor assure rotation of the rotor responsive to rotation of the motor shaft. Surrounding the rotor assembly is a stator assembly such that a voltage is generated responsive to the rotational velocity of the rotor assembly. The stator assembly is permanently mounted to the housing. A commutator is positioned about the stator such that a feedback potential is generated for the servo system of the motor arrangement.

The advantageous features realized include an automatic centering of the rotor with the shaft thereby eliminating close tolerance requirements of the various tachometer assembly components. The hub material may be analogous to that of the armature such that it has the same co-efficient of thermal expansion therefore making it capable of withstanding high and low temperature environments without detrimental effects in the generated signal. Due to the fact that the tachometer is mounted directly to the motor shaft the size of the tachometer is substantially reduced. Also the hubs can be made lightweight such that the moment of inertia of the mounting components is minimized. Furthermore there are no bearings required. Also, the direct coupling substantially increases the response between the motor rotor and the tachometer rotor. The assembly is rugged and can withstand high vibrational shocks commonly encountered in aircraft applications. Furthermore, manufacturing costs are greatly reduced since it is not necessary to maintain close tolerances in the components. The components are readily removable and interchangeable.

The above and further features of the present invention will be further discussed in the following description in which reference is made to an illustrative embodiment as presently used on magnetic tape transports.

FIG. 1 is an exploded perspective view of the tachometer-motor mounting assembly of the present invention;

FIG. 2 is a partial cross-sectional view of the assembly of the present invention; and FIG. 3 illustrates in cross-section the present tachometer-motor mounting assembly in which the tachometer and capstan are adjacently mounted on the motor shaft motor.

Referring to the drawings, the motor-tachometer mounting assembly is referred to by the general reference character 1 and is illustrated as presently used in association with a magnetic tape transport. The arrangement includes a driving motor 2 having a rotating shaft 3 protruding through opposing ends. Mounted to one end of the shaft 3 is illustrated a capstan 4 driving a magnetic tape portion 5. On the opposing longitudinal end of the shaft 3 is illustrated a direct current tachometer assembly referred to by the general reference character 10. The tachometer assembly 10 includes a housing 11 secured to the motor 2 by means of bolts 12. The housing 11 has a cylindrical cavity 14. Within the cavity 14 is permanently secured a stator in the form of a core-type permanent-magnet field 15. Though not clearly shown in the drawings, the field 15 is secured to the housing by means of pins or screws. Around the outer longitudinal edge of the field 15 is associated a commutator or brush assembly 16 which incorporates four brushes 17 spaced approximately 90° apart around the periphery of the field 15. The field 15 is positioned to be substantially concentric with the shaft 3. Also concentric with the shaft 3 is a first hub member 19 hereinafter referred to as the fixed mounting hub, since it is positionally fixed in relationship to the longitudinal axis of the shaft 3. The fixed mounting hub 19 has a lip portion around the outer periphery such as to form a first step 20 and a second step 21. Protruding through the hub is a pin member or set screw 22 which securely fastens the hub member 19 to the shaft 3.

Within the inner periphery of the field 15 and about the outer periphery of the mounting hub 19 is positioned the rotor in the form of a wound armature 23. The armature 23 has an outer peripheral surface of a diameter to coincide mechanically and electrically with the inner peripheral surface of the field 15. The inner peripheral surface of the armature 23 is shown as having a lip to coincide and engage the lip of the mounting hub 19 such that the steps 20 and 21 of the mounting hub guide and support the armature 23. The opposing inner longitudinal edge of the armature 23 is also illustrated as having a lip surface 24. Engaging the lip surface 24 is a second cylindrical mounting hub which is hereinafter referred to as a movable mounting hub 25 since it is slideable along the shaft 3 in relationship to the longitudinal axis of the shaft. The movable hub 25 carries an outer flange having a tapered edge 27. The tapered edge 27 engages the inner lip 24 of the armature 23. The movable hub 25 is slideable along the shaft 3 and is urged towards the motor 2 by fastening means comprising a screw 30 which is fastened concentrically to the shaft 3 within a threaded aperture 31. As illustrated the screw 30 carries an intermediate washer 32 which engages the hub 25. The fastening means is threaded such that as the screw 30 is tightened the washer 32 urges the movable hub member 25 towards the motor 2. The movable hub 25 simultaneously centers the armature 23 and urges it against the fixed hub member 19.

Due to the tapered edge of the movable hub 25, the machining tolerances of the inner surface of the armature 23, the tolerances of the fixed hub member 19 and the tolerances of the movable hub member 25 need not be of high precision to assure concentricity of the armature with the rotating shaft member 3. It may be noted that in the assembly of the present invention there are no bearings. It should be further noted that the only parts contributing to the moment of the inertia of the shaft 3 are the mounting hubs 19, 25 and the armature 23. Consequently, the moment of inertia is maintained minimal since these parts may be of very low weight material and are directly mounted on the shaft which allows for a substantial decrease in the length of the moment arm. It has been found that under the present structure the assembly is decreased by approximately one and one-half inches over similar systems utilizing similar size tachometers coupled to the end of the rotating member 3. The material of mounting hubs 19 and 25 and the material of the armature 23 and the outer material of the field 15 may all comprise similar materials, e.g., stainless steel, such that the coefficient of the thermal expansion is the same for all components. Consequently, as the operating temperatures vary, component expansions and contractions coincide such that misalignment or warpage is not realized. Also, in this structure, assembly of the parts is simplified since the parts are easily mounted by means of screws or other pins. There is no necessity for cementing or pressing of the various components. In FIG. 1 or 2 the tachometer is sealed from dust and other foreign particles by means of a cover 33 secured to the housing 11 by means of fastening members 34.

The embodiment of FIG. 3 illustrates a mounting assembly in which the tachometer is assembled intermediate the driven capstan 4 and the driving motor 2. This assembly permits further reduction in the overall size. The components of the assembly of FIG. 3 are substantially the same as those of FIGS. 1 and 2. Consequently the same reference numerals are utilized and the discussion will be limited to the distinguishable components.

The movable hub 25 has a pair of substantially diametrically opposed apertures 35 and 36 concentrically aligned with a pair of threaded bores 37 and 38, respectively, within the fixed hub member 19. Protuding through the aperture 35 and threaded with the bore 37 is a bolt member 39. Likewise, protruding through the aperture 36 and threaded in engagement with the bore 38 is a bolt member 40. Accordingly, as the bolt members 39 and 40 are adjusted, the movable hub 25 is urged towards the fixed hub 19, thus properly centering and securing the armature 23.

What is claimed is:

1. An electrical motor-tachometer mounting, comprising in combination:
   an electrical driving motor having a driven rotating shaft protruding through the motor housing;
   a tachometer housing secured to said motor housing and around said shaft;
   a tachometer-stator assembly secured within the tachometer housing and substantially concentric with said rotating shaft;
   a first hub member secured to said shaft member and having a circular cross-section concentric with said shaft member;
   a tachometer-rotor assembly having an outer periphery slightly less in diameter than the inner peripheral diameter of the stator assembly and forming a generator relationship between the rotor and the stator, said rotor engaging the first hub member;
   a second hub member having a circular cross-section and being slideably positioned concentric about said shaft, the second hub member having a tapered outer edge surface engaging an inner peripheral edge of the rotor; and
   means for urging the second hub member towards the first hub member and concentric with said rotating shaft member such that the rotor assembly is simultaneously urged in secure engagement with the first hub member and concentric with said rotating shaft member.

2. The mounting of claim 1 in which the materials of the first hub member, the second hub member, the rotor assembly and the stator have compatible coefficients of thermal expansion.

3. The mounting of claim 1 in which the first hub member has an outer lip portion and the rotor assembly has an inner lip portion, said lip portions substantially interlocking.

4. The mounting of claim 1 in which the first hub member has an outer lip portion, and the rotor assembly has inner lip portions at each of the opposing-inner longitudinal ends, the outer lip portion of the first hub member engaging and substantially interlocking with one lip portion of the rotor, and the other lip portion of the rotor engaging the tapered surface of the second hub member.

5. The mounting assembly of claim 4 further including a capstan secured to said shaft member, said capstan adapted for driving a magnetic tape the speed and tension of which is to be represented by the signal generated by the tachometer.

6. The mounting of claim 5 in which the capstan and tachometer are mounted on opposite ends of said shaft member, the longitudinal length of the second hub member extends beyond the end of the shaft and the means urging the second hub member towards the first hub member includes a fastening means simultaneously engaging the shaft member and the second hub member.

7. The mounting of claim 5 in which the tachometer is mounted intermediate the capstan and the motor housing, the first hub member has spaced bores each adapted to securely receive a pin fastener, the second hub member has spaced apertures, longitudinally aligned respectively with the bores of the first hub member, pin fasteners each simultaneously protruding through one of said apertures and simultaneously engaging one of said bores and urging the second hub member towards the first hub member.

8. The mounting assembly of claim 5 in which the stator assembly is a toroidal permanent magnet field assembly.

References Cited

FOREIGN PATENTS 123,686   2/1947   Australia.

ALLEN N. KNOWLES, *Primary Examiner*.

U.S. Cl. X.R.

226—42; 310—113; 321—30; 322—31